United States Patent [19]
Farstad

[11] 3,913,085
[45] Oct. 14, 1975

[54] MULTICHANNEL SYSTEM FOR SEISMIC SIGNATURE DETERMINATION

[75] Inventor: Arnold J. Farstad, Boulder, Colo.

[73] Assignee: Westinghouse Electric Corporation, Pittsburgh, Pa.

[22] Filed: Jan. 16, 1974

[21] Appl. No.: 433,955

[52] U.S. Cl. ........ 340/261; 340/15.5 DP; 340/16 R
[51] Int. Cl.²......................................... G08B 13/00
[58] Field of Search............ 340/261, 16 R, 15.5 DP

[56] References Cited
UNITED STATES PATENTS

| | | | |
|---|---|---|---|
| 2,368,953 | 2/1945 | Walsh | 340/261 X |
| 3,109,165 | 10/1963 | Bagno | 340/261 X |
| 3,171,406 | 3/1965 | Baum et al. | 340/16 R |
| 3,585,581 | 6/1971 | Aune et al. | 340/261 X |
| 3,691,549 | 9/1972 | Wilson | 340/261 |

*Primary Examiner*—David L. Trafton
*Attorney, Agent, or Firm*—M. P. Lynch

[57] ABSTRACT

The output signals of an array of seismic transducers such as geophones buried beneath the surface of the ground to provide perimeter intrusion protection, are supplied to a multichannel processing circuit which initially isolates that frequency portion of the signals attributable to intrusions in general, and subsequently determines the various repetition rates within the preselected frequency range to characterize the type of intrusion, i.e., a single pedestrian, a group of pedestrians, a vehicle, animals, etc.

4 Claims, 10 Drawing Figures

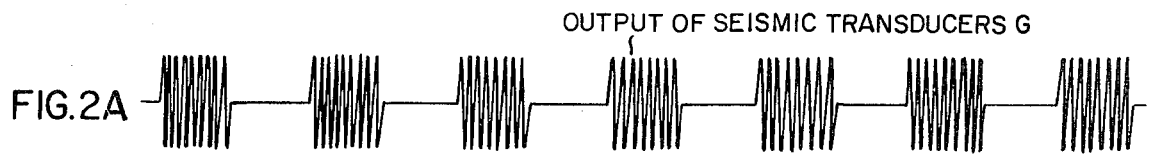
FIG.2A — OUTPUT OF SEISMIC TRANSDUCERS G
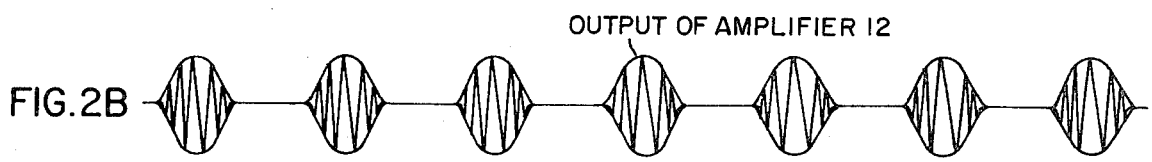
FIG.2B — OUTPUT OF AMPLIFIER 12
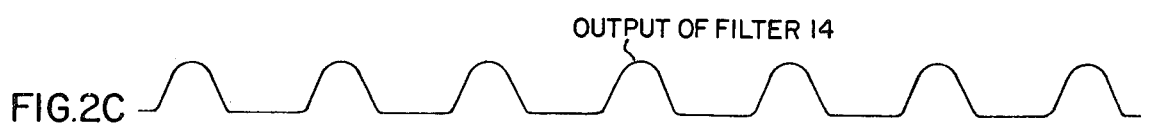
FIG.2C — OUTPUT OF FILTER 14
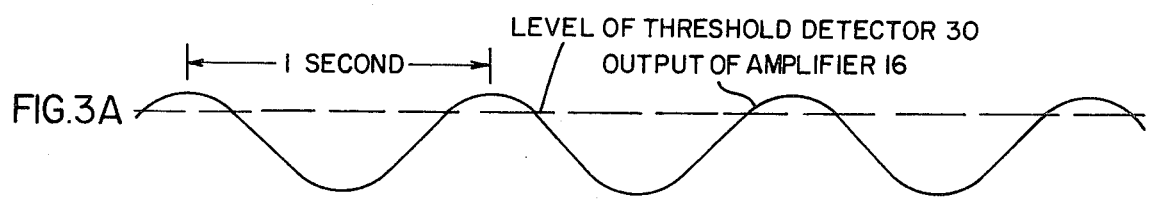
FIG.3A — LEVEL OF THRESHOLD DETECTOR 30 / OUTPUT OF AMPLIFIER 16 / ⟵ 1 SECOND ⟶
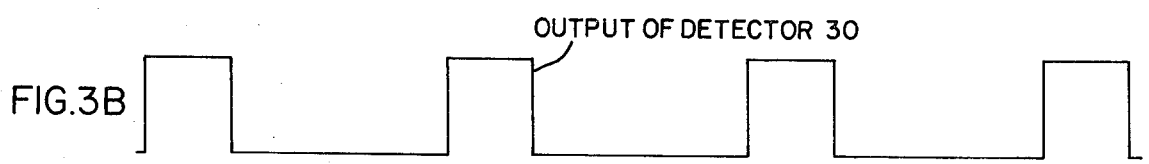
FIG.3B — OUTPUT OF DETECTOR 30
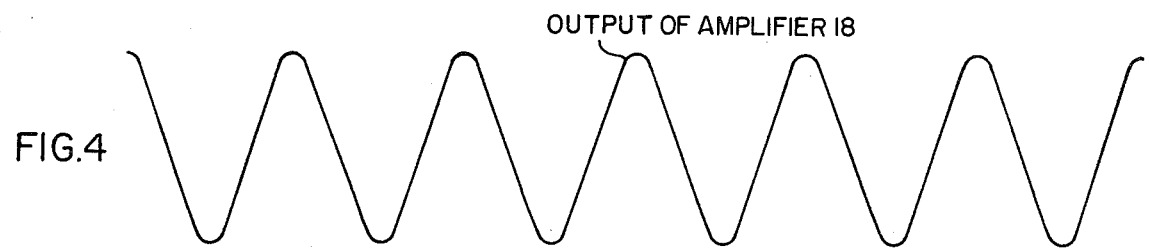
FIG.4 — OUTPUT OF AMPLIFIER 18
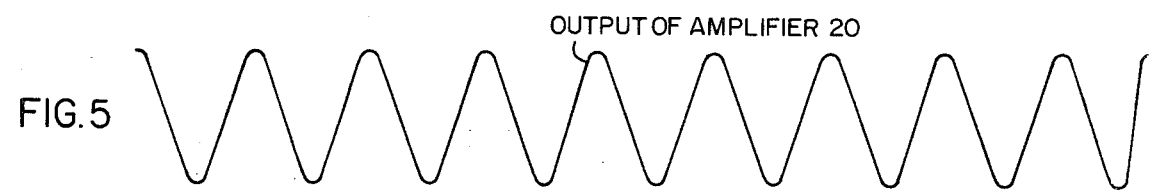
FIG.5 — OUTPUT OF AMPLIFIER 20
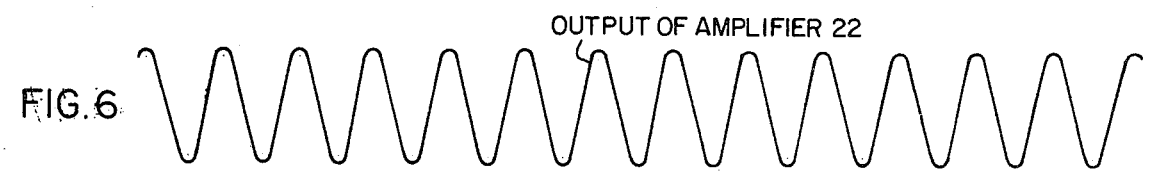
FIG.6 — OUTPUT OF AMPLIFIER 22
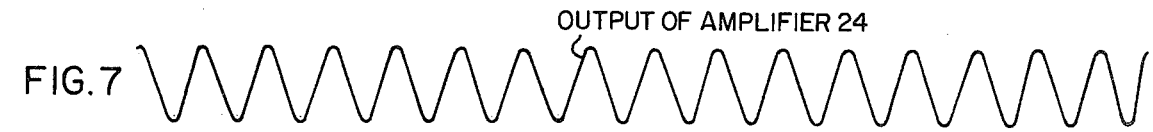
FIG.7 — OUTPUT OF AMPLIFIER 24

MULTICHANNEL SYSTEM FOR SEISMIC SIGNATURE DETERMINATION

CROSS-REFERENCE TO RELATED APPLICATION

This invention is related to the subject matter of patent application Ser. No. 433,954, filed Jan. 16, 1974 and entitled "Seismic Intrusion Detection System (W.E. 43,647)."

BACKGROUND OF THE INVENTION

There is described and illustrated in the above identified application entitled "Seismic Intrusion Detection System", the basic utilization of a seismic transducer in an intrusion detection system. Since the application of the seismic transducer for perimeter intrusion detection requires the installation of a plurality of transducers, there exists a practical requirement for signal processing circuitry to analyze the signals developed by the respective transducers.

SUMMARY OF THE INVENTION

There is described herein with reference to the accompanying drawings an embodiment of a signal processing scheme for analyzing the signals developed by the seismic transducers, typically represented as geophones, comprising a perimeter intrusion protection system in order to accurately characterize the type of intrusion occurring in a particular zone.

The geophone is a passive, low impedance device thus permitting the use of a single cable to monitor the outputs of a plurality of geophones to give a composite signal.

In the embodiment disclosed, an amplifier is tuned to pass the major frequency component of signals developed by the seismic transducers in response to seismic disturbances. The output of the amplifier is supplied to a bank of narrow band amplifiers each designed to respond to a different pulse repetition rate. Inasmuch as a class of intruders can be identified on a basis of pulse repetition rate, the pulse repetition rate information provided by the bank of narrow band amplifiers is processed and compared to repetition rates of known classes of intrusions in order to accurately characterize the class of intrusions reflected by the sginals of the seismic transducers.

Natural disturbances, such as wind and earthquakes, do not exhibit a prolonged uniform pulse pattern as do other disturbances. Thus natural disturbances can be readily identified and rejected by a system designed to detect pedestrian disturbances.

BRIEF DESCRIPTION OF THE DRAWINGS

The invention will become more readily apparent from the following exemplary description in connection with the accompanying drawings:

FIGS. 2A, 2B, 2C, 3A, 3B and 4–7 are illustrations of the waveforms produced by the embodiment of FIG. 1.

BRIEF DESCRIPTION OF THE PREFERRED EMBODIMENT

Figure 1:
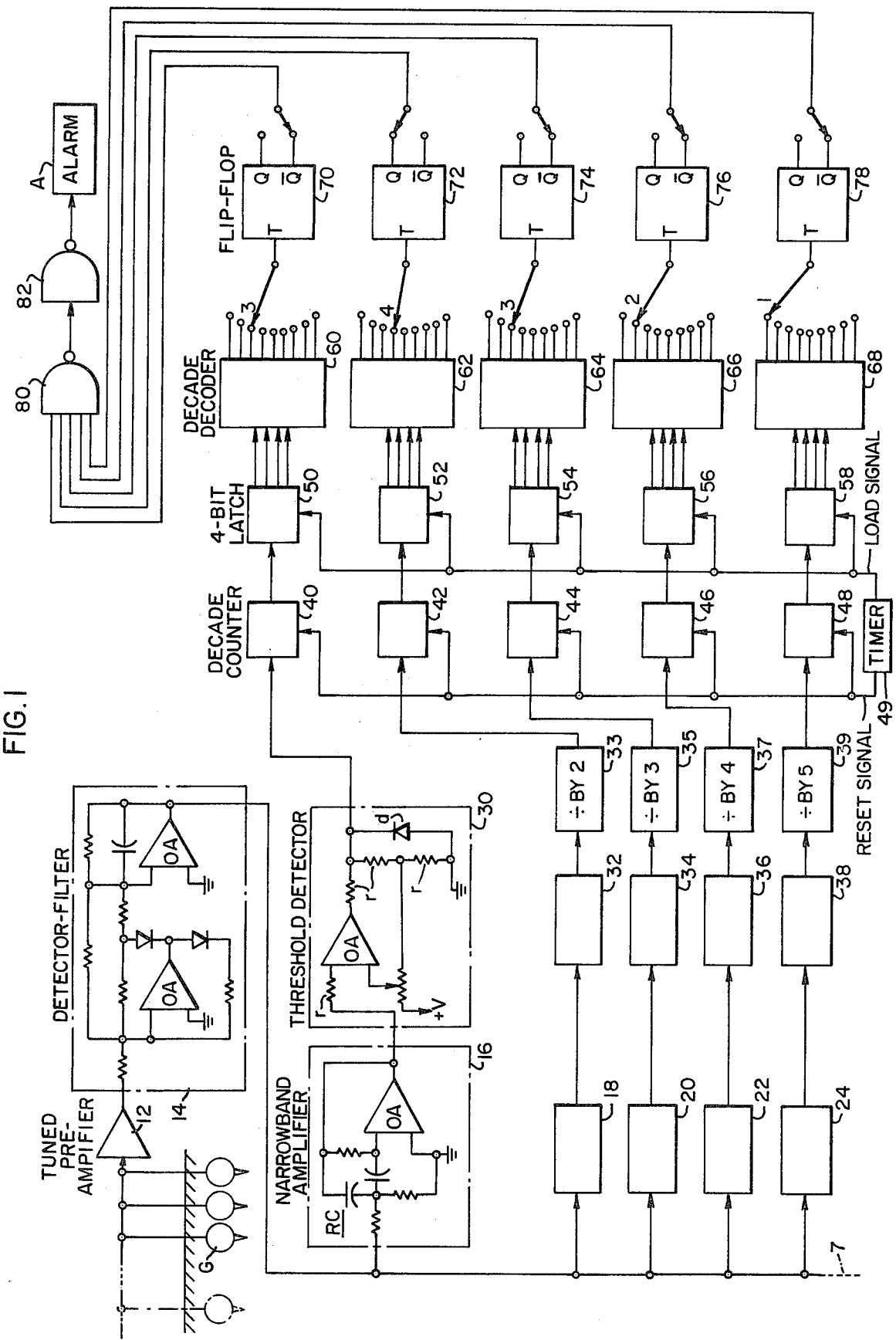
FIG. 1 is a schematic illustration of a signal processing circuitry in accordance with the teachings of the invention for analyzing output signals of seismic transducers.

Referring to FIG. 1 there is illustrated an array of seismic transducers, herein represented as geophones G, buried beneath the surface of the ground to define a perimeter intrusion detection system. Each geophone G is calibrated in terms of output voltage per particle velocity of ground motion in inches per second. The signals developed by the geophones G in response to surface distrubances are transmitted to the signal processing circuit 10 which analyzes the signals on the basis of frequency content and pulse repetition rate to classify the source of the surface disturbance, i.e. pedestrian movement, vehicular movement, natural disturbances such as wind and earthquake, etc.

It has been determined experimentally that several classes of intrusions, including pedestrian instrusions, produce seismic signals exhibiting a spectral peak in the frequency range of 30 to 50 hertz under specific local soil conditions. While the sensitive frequency range may vary from the 30 to 50 hertz range as a function of soil condition, i.e. snd vs. clay, the pulse repetition rates identified herein apply universally. Therefore, the output signals from the seismic transducers G are supplied to a tuned preamplifier 12 which is tuned to a center frequency of approximately 40 hertz with a 3db bandwidth of approximately 10 Hz.

The tuned preamplifier 12 can be implemented through the use of a conventional operational amplifier and resistor-capacitor feedback network designed to satisfy the center frequency and bandwidth requirements. The output from the tuned preamplifier 12 is supplied as an input signal to the detector-filter circuit 14 which is designed to pass only the single polarity envelope of the incoming waveform. The output signals developed by the seismic transducers G, the tuned preamplifier 12, and detector-filter circuit 14 are illustrated in FIGS. 2A, 2B and 2C respectively. A typical implementation of the detector-filter circuit 14 is shcematically illustrated as consisting of a pair of conventional operational amplifiers, such as appropriate resistors R and capacitors C to provide the sensitivity desired and a diode D to produce the rectified output waveform illustrated in FIG. 2C. The output signal of the detector-filter circuit 14 is supplied as an input signal to each of a plurality of narrow band amplifiers 16, 18, 20, 22 and 24 of the repetition rate channels A, B, C, D and E respectively. Each of the narrow band amplifiers is tuned to develop an output signal, as illustrated in FIGS. 3, 4A 5, 6, and 7, in response to the frequency content of the output signal of the detector-filter circuit 14; each channel being designed to respond to a different pulse repetition rate. The designation of the repetition rates for the respective channels is based on information characterizing repetition rates typically exhibited by classes of known disturbances. There is listed below a tabulation of pulse repetition rates experimentally obtained within the 30 to 50 hertz frequency range:

| Class of Intrusion | Pulse Repetition Rate |
|---|---|
| Person walking | 1.5–2 pulses per second |
| Person running | 3–4 pulses per second |
| Vehicle passing over smooth surface | No response |
| Vehicle passing over gravel surface | Random responses with accent on high pulse repetition rates |
| Animals walking | 3–5 pulses per second |
| Animals running | Higher than 5 pulses per second |
| Natural disturbances | Equal response by all transducers |

Thus in the embodiment illustrated, repetition rate channel A has been set to respond to a 1 Hz repetition rate while channel B has been set to respond to a 2 Hz repetition rate, channel C to a 3 Hz repetition rate; channel D to a 4 Hz repetition rate and channel E to a 5 Hz repetition rate. The output signals developed by the narrow band amplifiers of the respective repetition rate channels are illustrated in FIGS. 3A, 4, 5, 6 and 7 respectively. A typical implementation of the narrow band amplifier circuit used in the respective repetition rate channels is schematically illustrated in repetition rate channel A as consisting of an operational amplifier OA, and a resistor-capacitor feedback circuit RC designed to render the operational amplifier OA responsive to repetition rates of approximately 1 Hz. It is apparent that the implementation of the narrow band amplifiers for repetition rate channels B, C, D and E can be implemented in like manner with slight modifications to the values of the resistors and capacitors in the RC feedback networks in order to render the channels B, C, D, and E sensitive to repetition rates of 2 Hz, 3 Hz, 4 Hz, and 5 Hz respectively.

The outputs of the narrow band amplifiers 16, 18, 20, 22 and 24 are applied as input signals to threshold detectors 30, 32, 34, 36 and 38 respectively. Once again the implementation and function of the threshold detectors of the respective repetition rate channels is such that the discussion and detail illustration of the threshold detector 30 of channel A will prove adequate for an understanding of the operation of these circuits. The threshold detector 30 effectively converts the analog information supplied by the narrow band amplifier 16 to digital information in the form of a rectangular waveform of the type illustrated in FIG. 3B. In order for a particular output waveform from the narrow band amplifier 16 to qualify as a count, the amplitude of the waveform must exceed that of the predetermined threshold level T schematically illustrated as being provided by variable resistor R which is connected to a dc voltage source. The threshold level is selected to satisfy the class of disturbance of interest. For example, when pedestrian instrusion detection is desired, a threshold level is selected to be greater than that typically associated with an animal and approximating a pedestrian. Amplitudes recorded in response to animal intrusions, i.e., dogs, cats, etc., are substantially less than those recorded in response to pedestrian intrustion.

A typical implementation of the threshold detector circuit as schematically illustrated in FIG. 1 consists of an operational amplifier OA having a first input consisting of the output waveform from the narrow band amplifier 16 and a second input consisting of the threshold signal T. The operational amplifier OA in combination with the resistors r and the diode d function to provide a pulse repetition output signal of the type illustrated in FIG. 3B as an input signal to the decade counter 40. While the output pulse repetition rate from the threshold detector 30 of repetition rate channel A is supplied directly to the decade counter 40, the pulse outputs from the threshold detectors 32, 34, 36 and 38 are supplied to divider circuitry 33, 35, 37, and 39 respectively prior to being applied to a decade counters 42, 44, 46 and 48. The divider circuit 33 of channel B is designed to be a divide-by-two circuit such that the pulse output from the threshold detector 32, which corresponds to a 2 Hz repetition rate, is normalized to a pulse output signal corresponding to a pulse output signal of 1 Hz. Similarly, divider circuit 35 of channel C is a divide-by-three circuit which effectively normalizes the 3 Hz pulse repetition output signals of threshold detector 34 to a 1 Hz signal while divider circuit 34 is a divide-by-four circuit and divider circuit 39 is a divide-by-five circuit. Thus the repetition rate of the pulse signals supplied to decade counters 40, 42, 44, 46 and 48 are normalized to a 1 Hz repetition rate. The decade counters of the respective repetition rate channels are identical. While the embodiment illustrated utilizes decade counters for processing of the pulse repetition rate information, it will be apparent that shift registers could also be utilized to satisfy the signal processing operation to be described below.

The determination of a class of disturbance or intrusion as monitored by the geophones G will be made based on the distribution of the counts appearing in the decade counters 40, 42, 44, 46 and 48 over a specified period of time as determined by a timer circuit 49. Periodically, the timer circuit 49 functions to transfer the count information stored in the decade counters to four-bit latching circuits 50, 52, 54, 56 and 58 associated with the respective decade counters of repetition rate channels A, B, C, D, and E. The four-bit latching circuits function to convert the count information into a binary coded decimal readout which is supplied to decade decoder circuits 60, 62, 64, 66 and 68 of the respective repetition rate channels A, B, C, D and E. The 4-bit latching circuits can be typically implemented through the use of commercially available circuits such as the type CD4042A commercially available from RCA. Likewise the decade decoders can be implemented through the use of circuitry such as the type CD4017A commercially available from RCA. The binary coded decimal output of the 4-bit latching circuits is retained until the information in the 4-bit latching circuit is updated by the transfer of new information from the respective decade counters.

The signature or identification code of a predetermined type disturbance of interest, i.e. pedestrian intrusion, determines the selection of the outputs of the respective decade decoders for processing through the flip-flop circuits 70–78, the logic NAND gate 80, and the logic NOR gate 82 for actuation of the alarm circuit A. For the purpose of discussion, it will be assumed that the disturbance signature of interest is that of a pedestrian which corresponds to decade decoder outputs of channels A, B, C, D and E corresponding to 3, 4, 3, 2 and 1. Each decade decoder functions to convert the corresponding four line binary coded decimal output of the corresponding 4-bit latching circuit into 10 line decimal information. The flip-flop circuits 70–78 associated with the respective repetition rate channels function as digital threshold detectors and the complementary outputs from each of the flip-flop circuits, i.e. Q and $\bar{Q}$, are also selectable to signify respectively and a count greater than, or equal to or less than the digital count selected for that channel. In the embodiment illustrated the Q output of the flip-flop circuit 72 is selected and the $\bar{Q}$ output of the flip-flop circuits 70, 74, 76 and 78 is selected. Thus the alarm A will be actuated for count distributions as follows:

Channel A equal to or less than 3
Channel B greater than 4
Channel C equal to or less than 3
Channel D equal to or less than 2
Channel E equal to or less than 1

The multi-channel processing permits more accurate identification of a particular class of intrusion due to the fact that the circuitry can be adjusted to compensate for conditions existing at a particular installation. For example in a pedestrian intrusion application the setting of the flip-flops of the respective channels of FIG. 1 would compensate for the effects of terrain, soil composition, and unusual sources of interference not related to pedestrian intrusions, such as heavy machinery. It will be apparent that by varying the setting of the selection of the outputs of the flip-flops between Q and $\overline{Q}$ that the discrimination sensitivity of the system can be varied.

If as indicated above, shift registers were substituted for the decade counters in the embodiment of FIG. 1, the pulse count distributions could be effectively displayed as an array of lights on a light emitting diode (LED) matrix.

I claim:

1. A multi-channel signal processor for developing a signature of an earth disturbance in response to seismic signals, comprising, first means adapted to respond to seismic signals by developing a pulse output signal corresponding to the presence of a predetermined frequency component of said seismic signals, and a plurality of pulse repetition rate channels operatively connected to said first means, each of said channels including a narrow band amplifier to generate output signals in response to a different predetermined repetition rate of said output signals developed by said first means and an analog to digital converter means operatively connected to the output of said narrow band amplifier to convert the output signals of said narrow band amplifier to digital pulses and processor means operatively connected to said pulse repetition rate channels to respond to the digital output pulses produced by the respective channels to develop a signature of an earth disturbance based on the distribution of digital output pulses from the respective channels.

2. A multi-channel signal processor as claimed in claim 1 wherein each of said pulse repetition rate channels produces a count output indicative of the presence of the corresponding pulse repetition rate in said output signal of said first means, said processor means including count analyzer means operatively connected to said plurality of pulse repetition rate channels to analyze the distribution of counts in the respective pulse repetition rate channels to identify the disturbance producing seismic signals.

3. A multi-channel signal processor as claimed in claim 1 wherein said first means includes a detector-filter circuit means for developing an output signal in response to frequency components of said seismic signals occurring within a range of 30 to 50 hertz.

4. A multi-channel signal processor as claimed in claim 1 wherein said predetermined pulse repetition rates are in a range of approximately 1 to 5 pulses per second.

* * * * *